United States Patent
Song et al.

(10) Patent No.: US 12,451,717 B2
(45) Date of Patent: *Oct. 21, 2025

(54) ADAPTIVE MULTI-MODE CHARGING

(71) Applicant: Qualcomm Incorporated, San Diego, CA (US)

(72) Inventors: Chunping Song, Palo Alto, CA (US); Cheong Kun, San Diego, CA (US); Xiaolin Gao, San Jose, CA (US); Sanghwa Jung, Los Gatos, CA (US); Yue Jing, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/431,763

(22) Filed: Feb. 2, 2024

(65) Prior Publication Data
US 2024/0258819 A1    Aug. 1, 2024

Related U.S. Application Data

(63) Continuation of application No. 16/914,160, filed on Jun. 26, 2020, now Pat. No. 11,923,715.

(60) Provisional application No. 62/951,876, filed on Dec. 20, 2019.

(51) Int. Cl.
  *H02J 7/00* (2006.01)
  *H02J 7/02* (2016.01)
(52) U.S. Cl.
  CPC ......... *H02J 7/007192* (2020.01); *H02J 7/02* (2013.01); *H02J 2207/20* (2020.01)
(58) Field of Classification Search
  CPC .................................. H02J 7/007192
  USPC .......................................... 320/108
  See application file for complete search history.

(56) References Cited

U.S. PATENT DOCUMENTS

| | | | |
|---|---|---|---|
| 9,401,622 B2 | 7/2016 | Carobolante et al. |
| 10,516,284 B2 | 12/2019 | Maalouf et al. |
| 11,923,715 B2 | 3/2024 | Song et al. |
| 2013/0257360 A1 | 10/2013 | Singh |
| 2015/0042398 A1 | 2/2015 | Pan et al. |

(Continued)

FOREIGN PATENT DOCUMENTS

| | | |
|---|---|---|
| CA | 3052242 A1 | 8/2017 |
| CN | 106532831 A | 3/2017 |

(Continued)

OTHER PUBLICATIONS

International Search Report and Written Opinion—PCT/US2020/061856—ISA/EPO—May 11, 2021, 20 pages.

(Continued)

*Primary Examiner* — Yalkew Fantu
(74) *Attorney, Agent, or Firm* — Loza & Loza LLP

(57) ABSTRACT

An apparatus is disclosed for adaptive multi-mode charging. In an example aspect, the apparatus includes at least one charger having a first node and a second node. The at least one charger is configured to accept an input voltage at the first node. The at least one charger is also configured to selectively operate in a first mode to generate a first output voltage at the second node that is greater than or less than the input voltage or operate in a second mode to generate a second output voltage at the second node that is substantially equal to the input voltage.

18 Claims, 13 Drawing Sheets

(56) References Cited

U.S. PATENT DOCUMENTS

| | | | |
|---|---|---|---|
| 2015/0180249 A1* | 6/2015 | Jeon | H02J 50/90 |
| | | | 320/108 |
| 2015/0280457 A1 | 10/2015 | Jung et al. | |
| 2017/0170724 A1* | 6/2017 | Cheng | H02M 3/07 |
| 2017/0294807 A1 | 10/2017 | Van Den Brink et al. | |
| 2017/0346340 A1 | 11/2017 | Vitali et al. | |
| 2018/0083457 A1 | 3/2018 | Huang | |
| 2018/0083459 A1 | 3/2018 | Huang et al. | |
| 2018/0115025 A1* | 4/2018 | Huang | G05F 1/40 |
| 2018/0337545 A1 | 11/2018 | Crosby, II et al. | |
| 2019/0140466 A1 | 5/2019 | Zhang et al. | |
| 2019/0190284 A1* | 6/2019 | Pinto | H02J 7/00 |
| 2019/0341796 A1* | 11/2019 | Gu | H02J 50/10 |
| 2019/0386516 A1* | 12/2019 | Wan | H02J 50/12 |

FOREIGN PATENT DOCUMENTS

| | | | |
|---|---|---|---|
| CN | 106787055 A | 5/2017 | |
| CN | 109120024 A | 1/2019 | |
| EP | 3252915 A1 | 12/2017 | |
| EP | 3462565 A1 | 4/2019 | |
| JP | 2015537495 A | 12/2015 | |
| JP | 2018019577 A | 2/2018 | |
| JP | 2019506125 A | 2/2019 | |
| JP | 2019512995 A | 5/2019 | |
| JP | 2019531685 A | 10/2019 | |
| JP | 2020511104 A | 4/2020 | |
| WO | WO-2018052728 A1 | 3/2018 | |
| WO | 2018099257 A1 | 6/2018 | |
| WO | WO-2018184578 A1 | 10/2018 | |

OTHER PUBLICATIONS

Partial International Search Report—PCT/US2020/061856—ISA/EPO—Mar. 11, 2021, 11 pages.

Renesas: "ISL9241 Buck-Boost Configurable Battery Charger with SMBus Interface and USB Power Delivery", Datasheet, FN8945, Rev.0.00, Oct. 22, 2018, pp. 1-75.

* cited by examiner

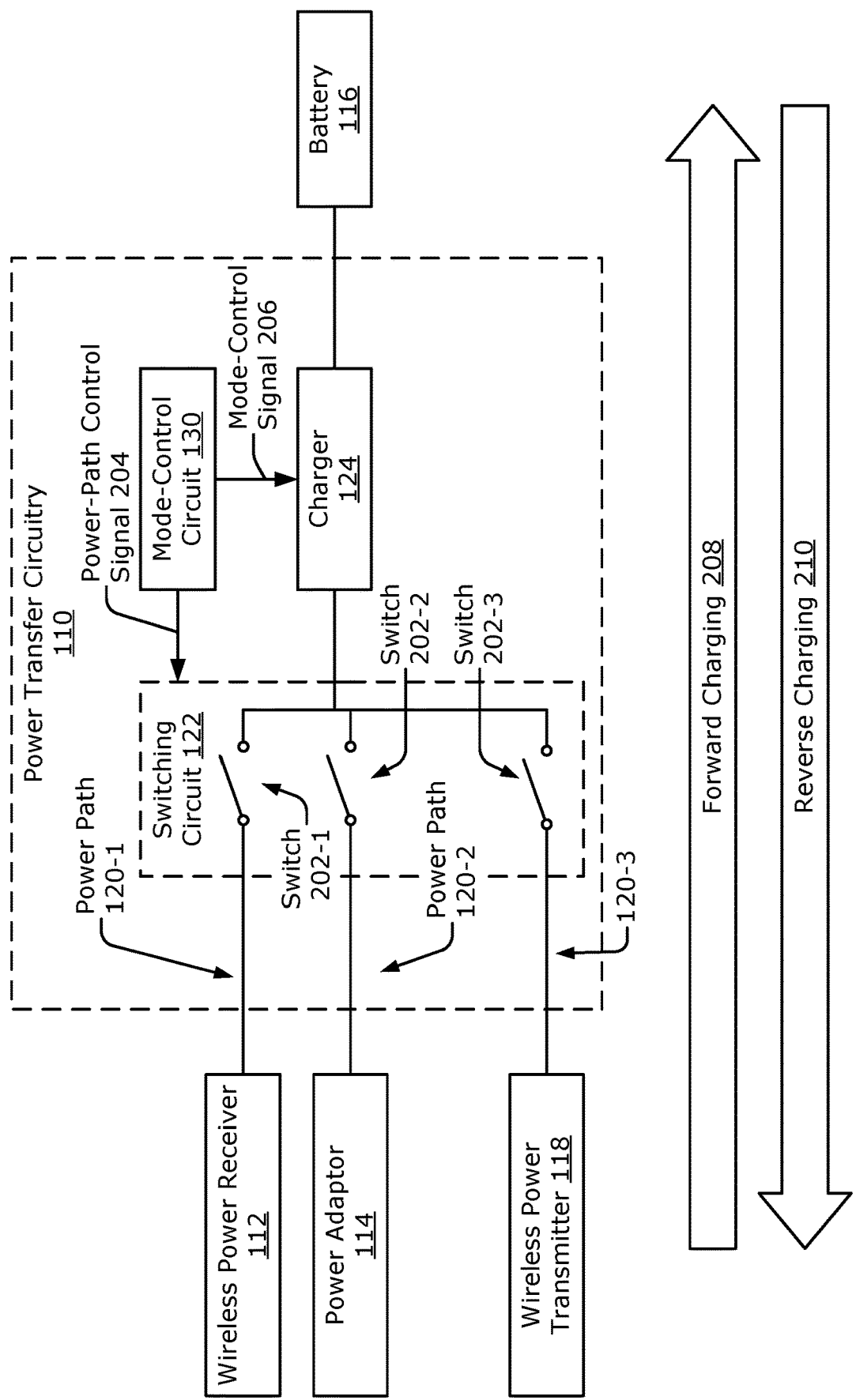

ADAPTIVE MULTI-MODE CHARGING

CROSS-REFERENCE TO RELATED APPLICATION(S)

The present application for patent is a Continuation of U.S. patent application Ser. No. 16/914,160, entitled "ADAPTIVE MULTI-MODE CHARGING" and filed on Jun. 26, 2020, and claims benefit of U.S. Provisional Application Ser. No. 62/951,876, entitled "ADAPTIVE MULTI-MODE CHARGING" and filed on Dec. 20, 2019, which is expressly incorporated by reference herein in its entirety.

TECHNICAL FIELD

This disclosure relates generally to battery charging and, more specifically, to a charger that can operate in multiple modes.

BACKGROUND

Batteries are reliable, portable energy sources that are used by a wide range of electronic devices including mobile phones, laptops, toys, power tools, medical device implants, electronic vehicles, and satellites. A battery, however, stores a fixed amount of charge that is depleted during mobile operation of the electronic device. Instead of requiring the purchase of a replacement, many batteries are rechargeable via another power source. The same battery can therefore be used multiple times.

An electronic device can include a charger to recharge the battery. The charger is designed to provide a particular voltage or current that is appropriate for charging the battery. Thus, the charger enables a transfer of power between, for instance, an adaptor that is plugged into a wall socket and the battery. By including the charger in the device, it is easier for a user to recharge the battery during the day as the user moves around. Unfortunately, incorporating into an electronic device a charger that can handle different charging scenarios is challenging.

SUMMARY

Apparatuses and techniques are disclosed that implement adaptive multi-mode charging. In particular, an example single charger can selectively operate as a charge pump (e.g., a voltage divider-type charge pump or a voltage multiplier-type charge pump), as a direct charger (e.g., a pass-through charger or a bypass charger), or another type of charger with a different conversion ratio. The charger can also selectively provide forward charging or reverse charging. With the ability to operate in different modes, the charger can support both wired and wireless charging. The charger can also be used to charge single-cell or multi-cell batteries.

In some situations, the multi-mode charger dynamically switches between different modes to optimize efficiency for different operating temperatures and loads. The charger can also be implemented to support different types of adaptors. Use of the example multi-mode charger obviates the need for implementing additional chargers within the apparatus, which can conserve space and reduce cost of the apparatus. Furthermore, any protection functions or features can be active for the different modes of the charger. Some apparatuses can include multiple multi-mode chargers to support multi-phase charging or multi-cell battery charging.

In an example aspect, an apparatus is disclosed. The apparatus includes at least one charger having a first node and a second node. The at least one charger is configured to accept an input voltage at the first node. The at least one charger is also configured to selectively operate in a first mode to generate a first output voltage at the second node that is greater than or less than the input voltage or operate in a second mode to generate a second output voltage at the second node that is substantially equal to the input voltage.

In an example aspect, an apparatus is disclosed. The apparatus includes supply means for providing an input voltage and load means for accepting an output voltage. The apparatus also includes charging means for transferring power from the supply means to the load means by selectively providing a first voltage as the output voltage in accordance with a first mode or a second voltage as the output voltage in accordance with a second mode. The first voltage is greater than or less than the input voltage and the second voltage is substantially equal to the input voltage.

In an example aspect, a method for adaptive multi-mode charging is disclosed. The method includes operating a charger as a voltage-divider-type charge pump or a voltage-multiplier-type charge pump during a first time interval. The operating the charger during the first time interval comprises accepting a first input voltage at a first node of the charger and generating, based on the first input voltage, a first output voltage at a second node of the charger. The first output voltage is less than or greater than the input voltage based on the charger operating as the voltage-divider-type charge pump or the voltage-multiplier-type charge pump, respectively. The method also includes operating the charger as a direct charger during a second time interval. The operating the charger during the second time interval comprises accepting a second input voltage at the first node of the charger and generating, based on the second input voltage, a second output voltage at the second node of the charger. The second output voltage is substantially equal to the second input voltage based on the charger operating as the direct charger.

In an example aspect, an apparatus is disclosed. The apparatus includes at least one power supply circuit, at least one load, at least one battery, a switching circuit coupled to the at least one power supply circuit and the at least one load, and at least one charger. The at least one charger comprises a first node coupled to the switching circuit and a second node coupled to the at least one battery. The at least one charger is configured to selectively transfer power from the at least one power supply circuit to the at least one battery based on the switching circuit connecting the at least one power supply circuit to the first node or transfer power from the at least one battery to the at least one load based on the switching circuit connecting the at least one load to the first node.

BRIEF DESCRIPTION OF DRAWINGS

FIG. 2 illustrates example power transfer circuitry for adaptive multi-mode charging.

FIG. 4-1 illustrates an example voltage-divider forward-charging mode of a charger for adaptive multi-mode charging.

FIG. 4-2 illustrates an example direct forward-charging mode of a charger for adaptive multi-mode charging.

FIG. 4-3 illustrates an example voltage-multiplier reverse-charging mode of a charger for adaptive multi-mode charging.

FIG. 4-4 illustrates an example direct reverse-charging mode of a charger for adaptive multi-mode charging.

DETAILED DESCRIPTION

An electronic device can include a charger to recharge the battery. The charger is designed to provide a particular voltage or current that is appropriate for charging the battery. Thus, the charger enables a transfer of power between, for instance, an adaptor that is plugged into a wall socket and the battery. By including the charger in the device, it is easier for a user to recharge the battery during the day as the user moves around. Unfortunately, incorporating into an electronic device a charger that can handle different charging scenarios is challenging.

Different types of chargers can be designed to perform under different operating conditions. For example, some chargers operate at high efficiency while providing a large charging current to the battery, and others operate at high efficiency while providing a small charging current to the battery. Additionally, some chargers can be used with different types of adaptors or can accept a wide range of input voltages.

Each of these different types of chargers are designed for a specific operating condition. Consequently, each individual charger type is unable to dynamically adapt to changes in the operating conditions. To address this, some techniques may implement multiple chargers within the electronic device and then enable an appropriate charger according to a current operating condition. Including multiple chargers can, however, increase a size and cost of the electronic device.

To address this, an apparatus is disclosed that implements adaptive multi-mode charging. In particular, the apparatus includes a multi-mode charger that can selectively operate as a charge pump (e.g., a voltage divider-type charge pump or a voltage multiplier-type charge pump), as a direct charger (e.g., a pass-through charger or a bypass charger), or another type of charger with a different conversion ratio. The charger can also selectively provide forward charging or reverse charging. With the ability to operate in different modes, the charger can support both wired and wireless charging. The charger can also be used to charge single-cell or multi-cell batteries.

In some situations, the multi-mode charger dynamically switches between different modes to optimize efficiency for different operating temperatures and loads. The charger can also be implemented to support different types of adaptors. Use of the charger obviates the need for implementing additional chargers within the apparatus, which can conserve space and reduce cost of the apparatus. Furthermore, any protection functions or features can be active for the different modes of the charger. Some apparatuses can include multiple multi-mode chargers to support multi-phase charging or multi-cell battery charging.

Figure 1:
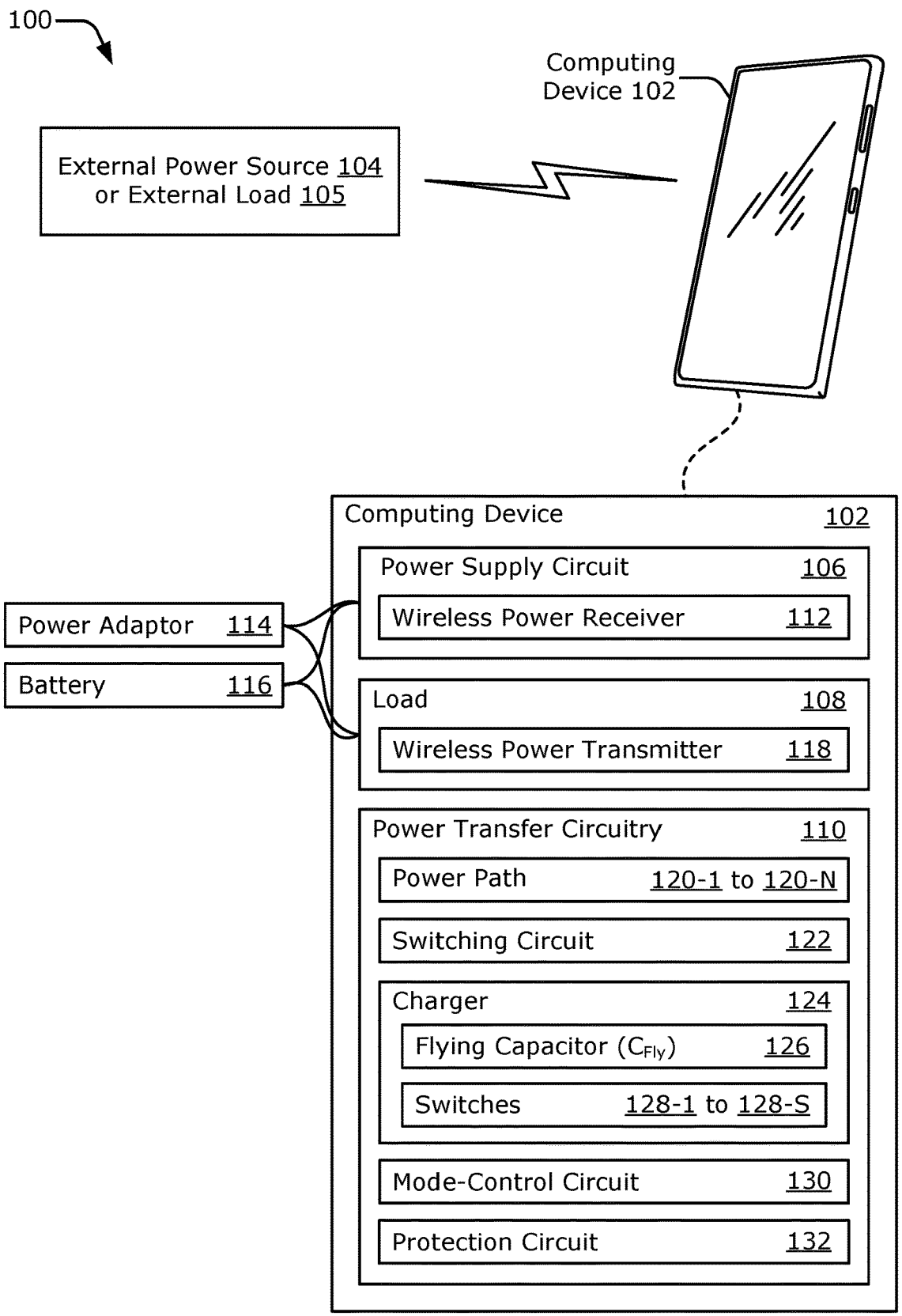
FIG. 1 illustrates an example environment for adaptive multi-mode charging.

FIG. 1 illustrates an example environment 100 for adaptive multi-mode charging. In the example environment 100, an example computing device 102 receives power from a power source 104 or provides power to an external load 105. The power source 104 can represent any type of power source, including a power outlet, a solar charger, a portable charging station, a wireless charger, another battery, and so forth. The external load 105 can represent an external peripheral, such as a headset or another computing device (e.g., another smartphone). In this example, the computing device 102 is depicted as a smartphone. However, the computing device 102 can be implemented as any suitable computing or electronic device, such as a modem, a cellular base station, a broadband router, an access point, a cellular phone, a gaming device, a navigation device, a media device, a laptop computer, a desktop computer, a tablet computer, a wearable computer, a server, a network-attached storage (NAS) device, a smart appliance or other internet of things (IoT) device, a medical device, a vehicle-based communication system, a radar, a radio apparatus, and so forth.

As illustrated, the computing device 102 can includes at least one power supply circuit 106, at least one load 108, and power transfer circuitry 110. Example types of power supply circuits 106 include a wireless power receiver 112, a power adaptor 114, or a battery 116. As an example, the power adaptor 114 can include a universal serial bus (USB) adaptor. Depending on the type of computing device 102, the battery 116 may comprise a lithium-ion battery, a lithium polymer battery, a nickel-metal hydride battery, a nickel-cadmium battery, a lead acid battery, and so forth. The battery 116 can also include a single-cell battery, a multi-cell battery (e.g., a two-cell battery), or multiple batteries, such as a main battery and a supplemental battery.

In some cases, the power supply circuit 106 jointly operates with the external power source 104 to provide power to the computing device 102. For example, the wireless power receiver 112 provides wireless charging using the external power source 104, which can include a wireless power transmitter of another device. As another example, the power adaptor 114 provides wired charging using the external power source 104, which can include the power outlet.

The load 108 is internal to the computing device 102. Example types of loads include the power adaptor 114, the battery 116, or a wireless power transmitter 118. Other example loads 108 include a fixed load, a variable load, or a load associated with a component of the computing device 102, such as an application processor, an amplifier within a wireless transceiver, or a display (not shown in FIG. 1). In some cases, the load 108 provides power to the external load 105. For example, the wireless power transmitter 118 provides wireless charging for the external load 105, which can include a wireless power receiver of another device. As another example, the power adaptor 114 provides wired charging to the external load 105, which can include a battery of another device.

The power transfer circuitry 110 of the computing device 102 includes one or more power paths 120-1 to 120-N, at least one switching circuit 122, and at least one charger 124. The variable N represents a positive integer. The power transfer circuitry 110 can transfer power from one or more power sources (e.g., the external power source 104 or the power supply circuit 106) to one or more loads (e.g., the external load 105 or the load 108). This power is transferred along one or more power paths 120-1 to 120-N, which couple the one or more power sources or one or more loads to the switching circuit 122.

The switching circuit 122 can provide isolation for individual power paths 120-1 to 120-N. For example, the switching circuit 122 can isolate one of the power paths 120-1 to 120-N from the battery 116 to prevent leakage current from flowing from the battery 116 to one of the power paths 120-1 to 120-N. For implementations that include multiple power paths 120-1 to 120-N, the switching circuit 122 can enable individual power paths 120 to be connected to the charger 124 and provide isolation between the power paths 120-1 to 120-N.

The charger 124 implements, at least partially, adaptive multi-mode charging. The charger 124 includes at least one flying capacitor 126 and switches 128-1 to 128-S, where S represents a positive integer. The flying capacitor 126 and the switches 128-1 to 128-S are further described with respect to FIGS. 3 and 8. The charger 124 can be implemented on a stand-alone integrated circuit or as part of a power-management integrated circuit (PMIC), which implements additional functions.

The charger 124 can operate in different modes, which enables the charger 124 to operate as a charge pump (e.g., a voltage divider-type charge pump or a voltage multiplier-type charge pump) or a direct charger. In some cases, a conversion ratio of the charger 124 can vary for different modes. For example, the charge pump can implement a divide-by-two charge pump that provides a 2:1 conversion ratio, a multiply-by-two charge pump that provides a 1:2 conversion ratio, or a direct charger that provides a 1:1 conversion ratio.

Generally, the charger 124 can implement a divide-by-N charge pump or a multiply-by-N charge pump, where N represents a positive integer (e.g., 1, 2, 3, or 4). Some types of chargers 124 can operate with additional conversion ratios, such as a 1:3 conversion ratio, a 3:1 conversion ratio, a 2:3 conversion ratio, a 3:2 conversion ratio, a 1:4 conversion ratio, a 4:1 conversion ratio, a 2:4 conversion ratio, a 4:2 conversion ratio, and so forth. Some modes can enable the charger 124 to perform forward charging, and other modes can enable the charger 124 to perform reverse charging. These modes are further described below.

The power transfer circuitry 110 also includes at least one mode-control circuit 130 and at least one protection circuit 132. The mode-control circuit 130 can include a bias voltage generator (not shown in FIG. 1), which generates different bias voltages based on a software or hardware command. These bias voltages, which can establish different switch states, control a mode of the charger 124 and a configuration of the switching circuit 122. By providing different bias voltages, the mode-control circuit 130 can dynamically change the mode of the charger 124 as the operating conditions change.

The protection circuit 132 can provide a variety of protections, including input under-voltage lock-out, input overvoltage lock-out, surge protection, input current limit regulation, input peak current limit, battery overvoltage, battery overcurrent, programmable die and/or skin thermal regulation, die thermal shutdown, reverse current protection, input short protection, output short protection, input-to-output voltage ratio monitoring, or some combination thereof. In some implementations, thresholds associated with the protection circuit 132 can be adjusted based on an operational mode of the charger 124. For example, the input-to-output voltage ratio monitoring can have an expected voltage ratio adjusted based on whether the charger 124 operates as a voltage divider-type charge pump or a voltage multiplier-type charge pump. The expected voltage ratio can also be adjusted as the charger 124 operates in different modes that provide different conversion ratios. Some protection circuits 132 can be designed to provide protection during both forward charging and reverse charging. In this case, the protection circuits 132 can be designed to sense currents that flow in a forward direction from the power path 120 to the battery 116 and currents that flow in a reverse direction from the battery 116 to the power path 120. Various types of protection circuits 132 are further described with respect to FIG. 9.

In some implementations, the power transfer circuitry 110 includes a main charger (not shown), which can be implemented in parallel with the charger 124. In this case, the charger 124 can operate as a slave charger while the main charger operates as a master charger. The power transfer circuitry 110 is further described with respect to FIG. 2.

Figures 1, 4:
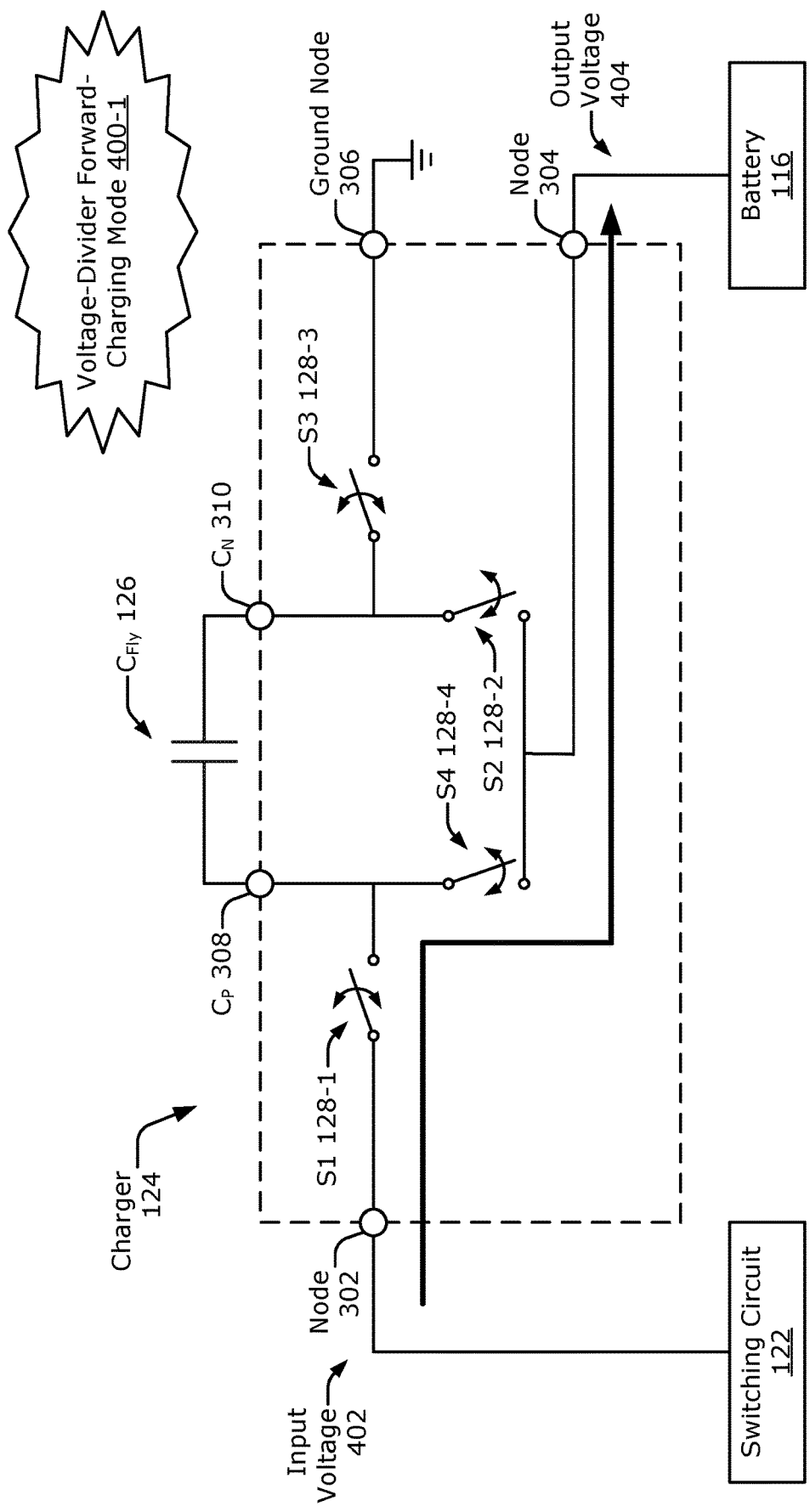
Figures 2, 4:
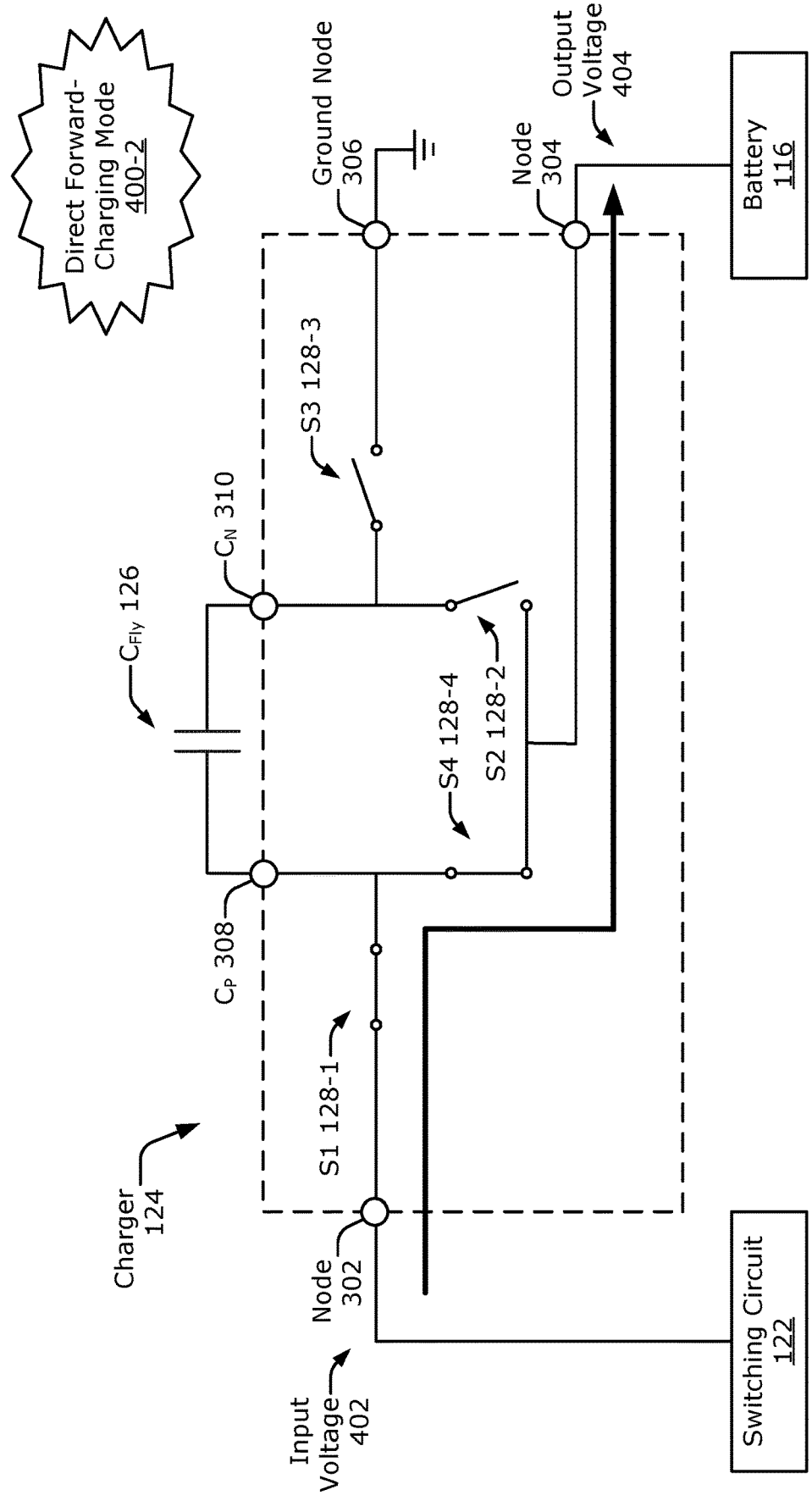
Figures 3, 4:
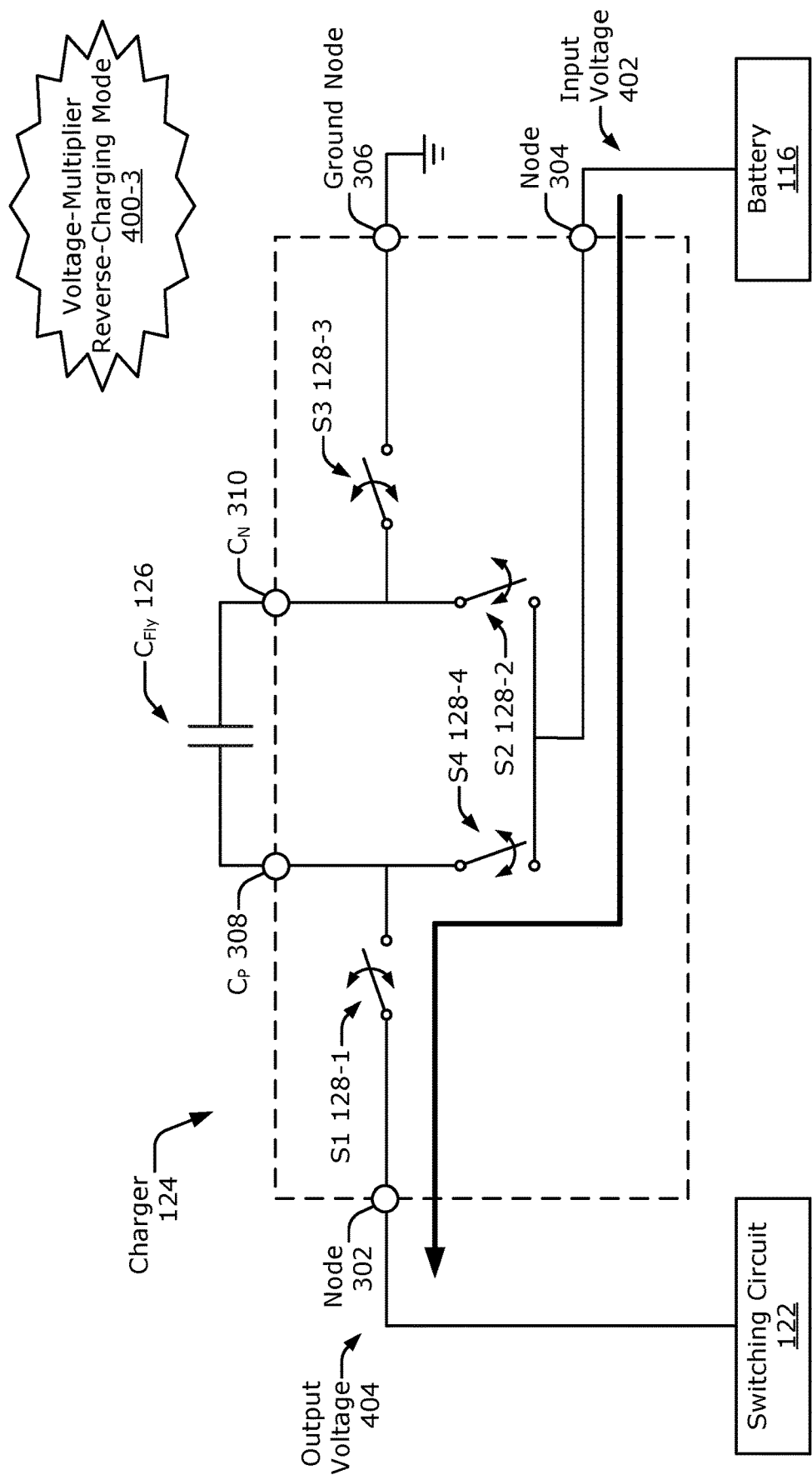
Figure 4:
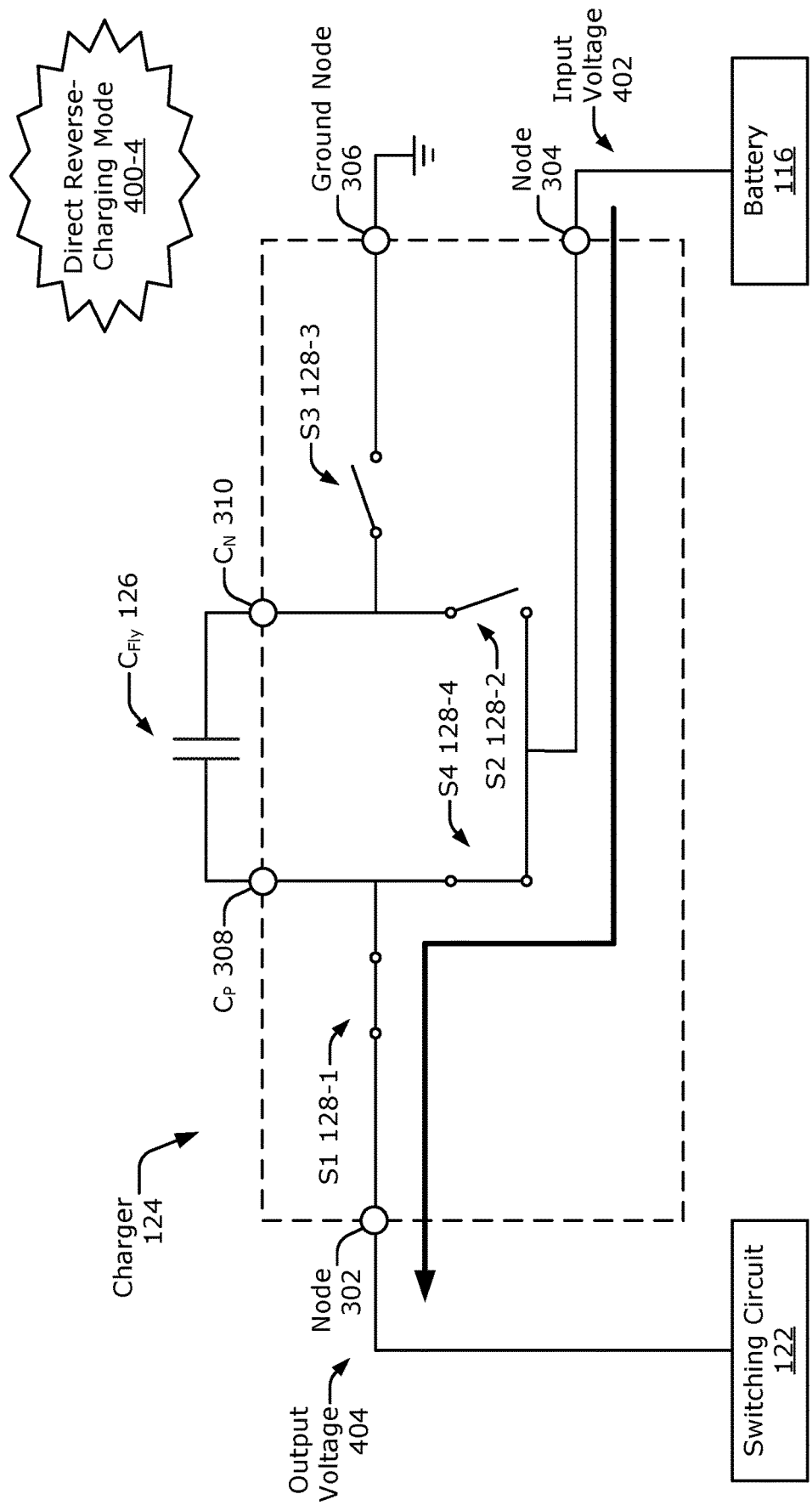

FIG. 2 illustrates example power transfer circuitry 110 for adaptive multi-mode charging. In the depicted configuration, the power transfer circuitry 110 is coupled to the wireless power receiver 112, the power adaptor 114, the wireless power transmitter 118, and the battery 116. Although not explicitly shown, the power transfer circuitry 110 can also include an output capacitor coupled in parallel with the battery 116.

The power transfer circuitry 110 includes a first power path 120-1, a second power path 120-2, and a third power path 120-3. The first power path 120-1 couples the wireless power receiver 112 to the switching circuit 122. The second power path 120-2 couples the power adaptor 114 to the switching circuit 122. The third power path 120-3 couples the wireless power transmitter 118 to the switching circuit 122.

The switching circuit 122 is coupled between the power paths 120-1 to 120-3 and the charger 124. The switching circuit 122 includes a first switch 202-1, a second switch 202-2, and a third switch 202-3. The first switch 202-1 selectively connects or disconnects the wireless power receiver 112 to the charger 124. Likewise, the second switch 202-2 selectively connects or disconnects the power adaptor 114 to the charger 124. The third switch 202-3 selectively connects or disconnects the wireless power transmitter 118 to the charger 124. The charger 124 is coupled between the switching circuit 122 and the loads 108-1 and 108-2.

The mode-control circuit 130 is coupled to the switching circuit 122 and the charger 124. During operation, the mode-control circuit 130 generates a power-path control signal 204, which controls states of the switches 202-1 to 202-3. With the power-path control signal 204, the mode-control circuit 130 can enable power to be transferred between the charger 124 and any one of the power paths 120-1 to 120-3. The mode-control circuit 130 also generates a mode-control signal 206, which controls a mode of the charger 124.

As described above, each mode can be associated with a particular conversion ratio and charging direction. A mode that supports forward charging 208 enables power to transfer from one of the power paths 120-1 or 120-2 to the charger 124. Another mode that supports reverse charging 210 enables power to transfer from the charger 124 to one of the power paths 120-2 or 120-3. For example, power can be transferred from the wireless power receiver 112 or the power adaptor 114 to the battery 116 during forward charging 208. In contrast, power can be transferred from the battery 116 to the power adaptor 114 or the wireless power transmitter 118 during reverse charging 210. As described above, the battery 116 can act as the load 108 during forward charging 208 or can act as the power supply circuit 106 during reverse charging 210. Likewise, the power adaptor 114 can act as the power supply circuit 106 during forward charging 208 or can act as the load 108 during reverse charging 210. Both the power-path control signal 204 and the mode-control signal 206 can include multiple bias voltages, which bias the gate voltage of transistors that implement the switches 202-1 to 202-3 and the switches 128-1 to 128-S of the charger 124 (shown in FIG. 1). The charger 124 is further described with respect to FIG. 3.

Figure 3:
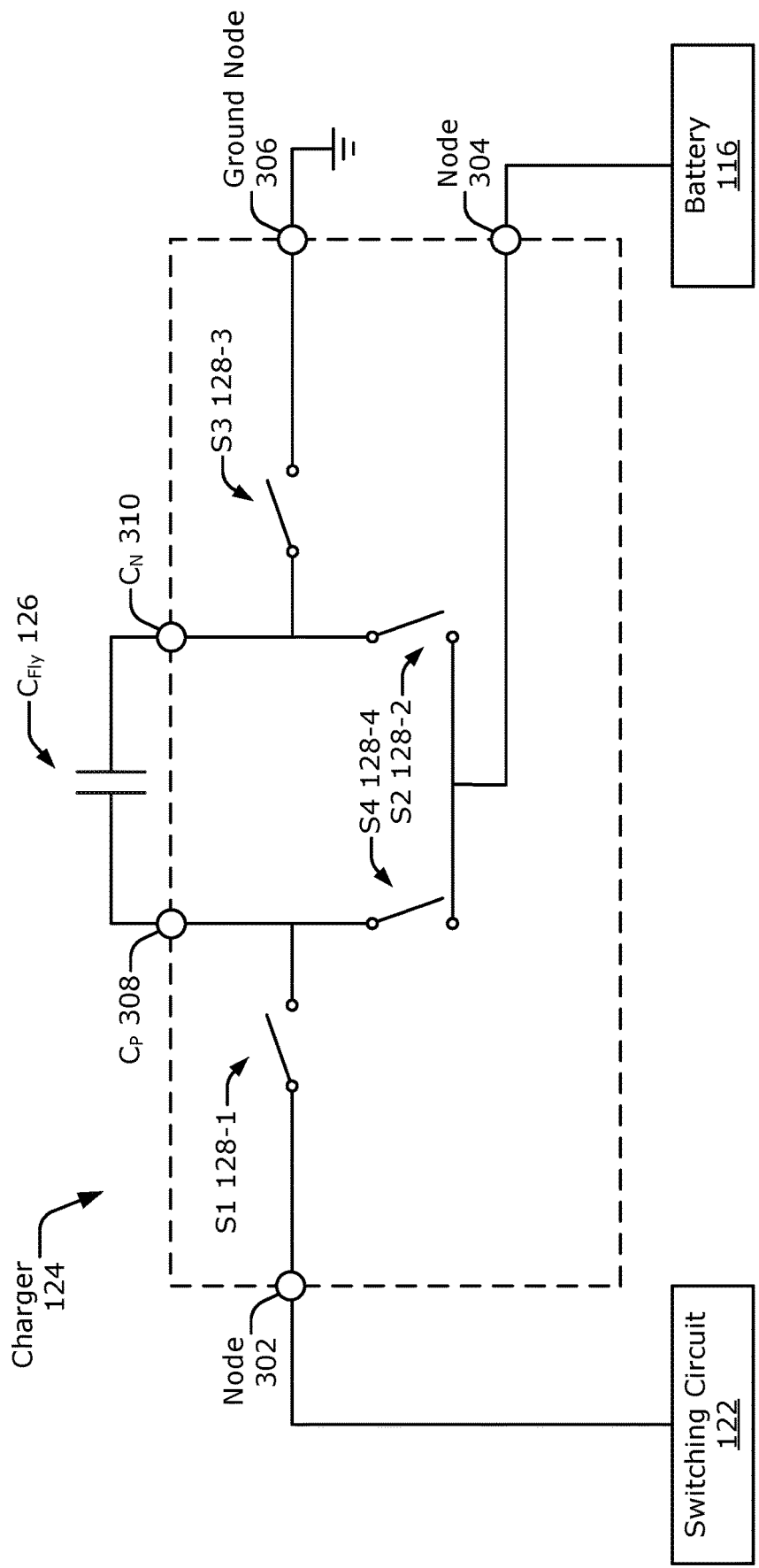
FIG. 3 illustrates an example charger for adaptive multi-mode charging.

FIG. 3 illustrates an example charger 124 for adaptive multi-mode charging. In the depicted configuration, the charger 124 is implemented as a divide-by-two charge pump or a multiply-by-two charge pump, which can provide a conversion ratio of 2:1 or 1:2, respectively. Other implementations can include a divide-by-three charge pump, a divide-by-four charge pump, or a divide-by-N charge pump.

The charger 124 includes a node 302, another node 304, and a ground node 306. The node 302 is coupled to the switching circuit 122. The other node 304 is coupled to the battery 116. For forward charging 208, the node 302 operates as an input node and the node 304 operates as an output node. Alternatively, for reverse charging 210, the node 304 operates as the input node and the node 302 operates as the output node.

The charger 124 includes the flying capacitor 126 ($C_{Fly}$ 126), which is coupled to a positive node 308 ($C_P$ 308) and a negative node 310 ($C_N$ 310). The charger 124 also includes four switches 128-1 to 128-4. The switches 128-1 to 128-4 can be implemented using transistors, such as metal-oxide-semiconductor field-effect transistors (MOSFETs), junction field-effect transistors (JFETs), bipolar junction transistors (BJTs), insulated gate bipolar transistors (IGBTs), diodes, and so forth. An example implementation of the switches 128-1 to 128-4 is further described with respect to FIG. 5.

The first switch 128-1 (S1 128-1) is coupled between the positive node 308 and the node 302. The second switch 128-2 (S2 128-2) is coupled between the negative node 310 and the node 304. The first switch 128-1 and the second switch 128-2 can operate together to form a charging circuit, which charges the flying capacitor 126.

The third switch 128-3 (S3 128-3) is coupled between the ground node 306 and the negative node 310. The fourth switch 128-4 (S4 128-4) is coupled between the positive node 308 and the node 304. The third switch 128-3 and the fourth switch 128-4 can operate together to form a discharging circuit, which discharges the flying capacitor 126. The charger 124 of FIG. 3 can operate as a divide-by-two charge pump, a multiply-by-two charge pump, or a direct charger to support forward charging 208 or reverse charging 210, as further described with respect to FIGS. 4-1 to 4-4.

FIG. 4-1 illustrates an example voltage-divider forward-charging mode 400-1 of the charger 124 for adaptive multi-mode charging. During the voltage-divider forward-charging mode 400-1, the charger 124 operates as a voltage-divider-type charge pump to support forward charging 208. In the depicted configuration, the switches 128-1 to 128-4 are active. In particular, the switches 128-1 and 128-2 open and close according to a charging phase signal while the switches 128-3 and 128-4 open and close according to a discharging phase signal. During this mode, the charger 124 provides a conversion ratio of 2:1. In other words, the charger 124 generates an output voltage 404 at the node 304 that is half an input voltage 402 at the node 302. In this mode, an output current that flows to the battery 116 is twice an input current that flows into the node 302. By increasing the output current relative to the input current, the charger 124 can reduce a time it takes to charge the battery 116.

During operation, the switching circuit 122 can connect the wireless power receiver 112 or the power adaptor 114 to the node 302. In particular, the switch 202-1 (of FIG. 2) can be closed and the switches 202-2 and 202-3 (of FIG. 2) can be open to connect the wireless power receiver 112 to the node 302 and isolate both the power adaptor 114 and the wireless power transmitter 118 from the node 302. Alternatively, the switches 202-1 and 202-3 can be opened and the switch 202-2 can be closed to connect the power adaptor 114 to the node 302 and isolate both the wireless power receiver 112 and the wireless power transmitter 118 from the node 302.

The voltage-divider forward-charging mode 400-1 enables the charger 124 to operate at a high efficiency while providing a large current to the battery 116. The voltage-divider forward-charging mode 400-1 can be used while the power transfer circuitry 110 operates within a particular thermal or current threshold. To manage the temperature, the charger 124 can dynamically switch to a direct forward-charging mode 400-2, as further described in FIG. 4-2.

FIG. 4-2 illustrates an example direct forward-charging mode 400-2 of the charger 124 for adaptive multi-mode charging. During the direct forward-charging mode 400-2, the charger 124 operates as a direct charger to support forward charging 208. In the depicted configuration, the first switch 128-1 and the fourth switch 128-4 are closed (e.g., in a closed state) while the second switch 128-2 and the third switch 128-3 are opened (e.g., in an open state). During this mode, the charger 124 provides a conversion ratio of 1:1. In other words, the charger 124 generates an output voltage 404 at the node 304 that is substantially equal to (e.g., within approximately 90% of) an input voltage 402 at the node 302. In this mode, the output current that flows to the battery 116 is substantially equal to an input current that flows into the node 302. During operation, the switching circuit 122 can connect the wireless power receiver 112 or the power adaptor 114 to the node 302.

The direct forward-charging mode 400-2 enables the charger 124 to operate at a high efficiency while providing a small current to the battery 116. Although this can increase the time it takes to charge the battery 116, the temperature within the power transfer circuitry 110 can decrease. In general, the charger 124 can dynamically switch between the direct forward-charging mode 400-2 and the voltage-divider forward-charging mode 400-1 of FIG. 4-1 to manage temperature of the power transfer circuitry 110 while decreasing charging times.

For example, the mode-control circuit 130 can monitor a temperature associated with the computing device 102, such as a temperature associated with the power supply circuit 106, the load 108, or the power transfer circuitry 110. If the monitored temperature exceeds a first threshold, the mode-control circuit 130 causes the charger 124 to transition from the voltage-divider forward-charging mode 400-1 to the direct forward-charging mode 400-2, to enable the temperature to decrease. If the monitored temperature drops below a second threshold, the mode-control circuit 130 causes the charger 124 to transition the direct forward-charging mode 400-2 to the voltage-divider forward-charging mode 400-1.

FIG. 4-3 illustrates an example voltage-multiplier reverse-charging mode 400-3 of the charger 124 for adaptive multi-mode charging. During the voltage-multiplier reverse-charging mode 400-3, the charger 124 operates as a voltage-multiplier-type charge pump to support reverse charging 210. In the depicted configuration, the switches 128-1 to 128-4 are active. In particular, the switches 128-1 and 128-2 open and close according to a charging phase signal while the switches 128-3 and 128-4 open and close according to a discharging phase signal. During this mode, the charger 124 provides a conversion ratio of 1:2. In other words, the charger 124 generates an output voltage 404 at the node 302 that is twice an input voltage 402 at the node 304. In this mode, an output current that flows into the switching circuit 122 is half an input current that flows into the node 304 from the battery 116.

This mode enables power to be transferred from the battery 116 to the external load 105 using the power adaptor 114 of the power path 120-2 or the wireless power transmitter 118 of the power path 120-3. During operation, the switching circuit 122 can connect the power adaptor 114 or the wireless power transmitter 118 to the node 302. The voltage-multiplier reverse-charging mode 400-3 enables the charger 124 to support high-power reverse wireless or wired charging without relying on additional components or chargers.

FIG. 4-4 illustrates an example direct reverse-charging mode 400-4 of the charger 124 for adaptive multi-mode charging. During the direct reverse-charging mode 400-4, the charger 124 operates as a direct charger to support reverse charging 210. In the depicted configuration, the first switch 128-1 and the fourth switch 128-4 are closed while the second switch 128-2 and the third switch 128-3 are opened. During this mode, the charger 124 provides a conversion ratio of 1:1. In other words, the charger 124 generates an output voltage 404 at the node 302 that is substantially equal to an input voltage 402 at the node 304. In this mode, an output current that flows to the switching circuit 122 is substantially equal to an input current that flows into the node 304 from the battery 116. During operation, the switching circuit 122 can connect the power adaptor 114 of the power path 120-2 or the wireless power transmitter 118 of the power path 120-3 to the node 302. The direct reverse-charging mode 400-4 enables the charger 124 to support low-power reverse wireless or wired charging without relying on additional components or chargers.

In some cases, the computing device 102 can send a command to the power transfer circuitry 110 or the mode-control circuit 130 to enable one of the reverse-charging modes 400-3 or 400-4. In other cases, the power transfer circuitry 110 (or the mode-control circuit 130) can automatically activate reverse charging. As an example, the power transfer circuitry 110 can activate one of the reverse-charging modes 400-3 or 400-4 responsive to determining that no input power is present and determining that the battery voltage is sufficient for reverse charging. For reverse wireless charging, the power transfer circuitry 110 can activate one of the reverse-charging modes 400-3 or 400-4 responsive to receiving a wireless signal from the other device's wireless receiver.

In general, the charger 124 can dynamically switch between the direct reverse-charging mode 400-4 and the voltage-multiplier reverse-charging mode 400-3 of FIG. 4-3 to manage temperature of the power transfer circuitry 110 while decreasing charging times. In order to switch between different modes 400-1 to 400-4, the power transfer circuitry 110 may implement a soft-start process that gradually adjusts a voltage at one of the power paths 120-1 to 120-3 to avoid providing a large initial current.

Figure 5:
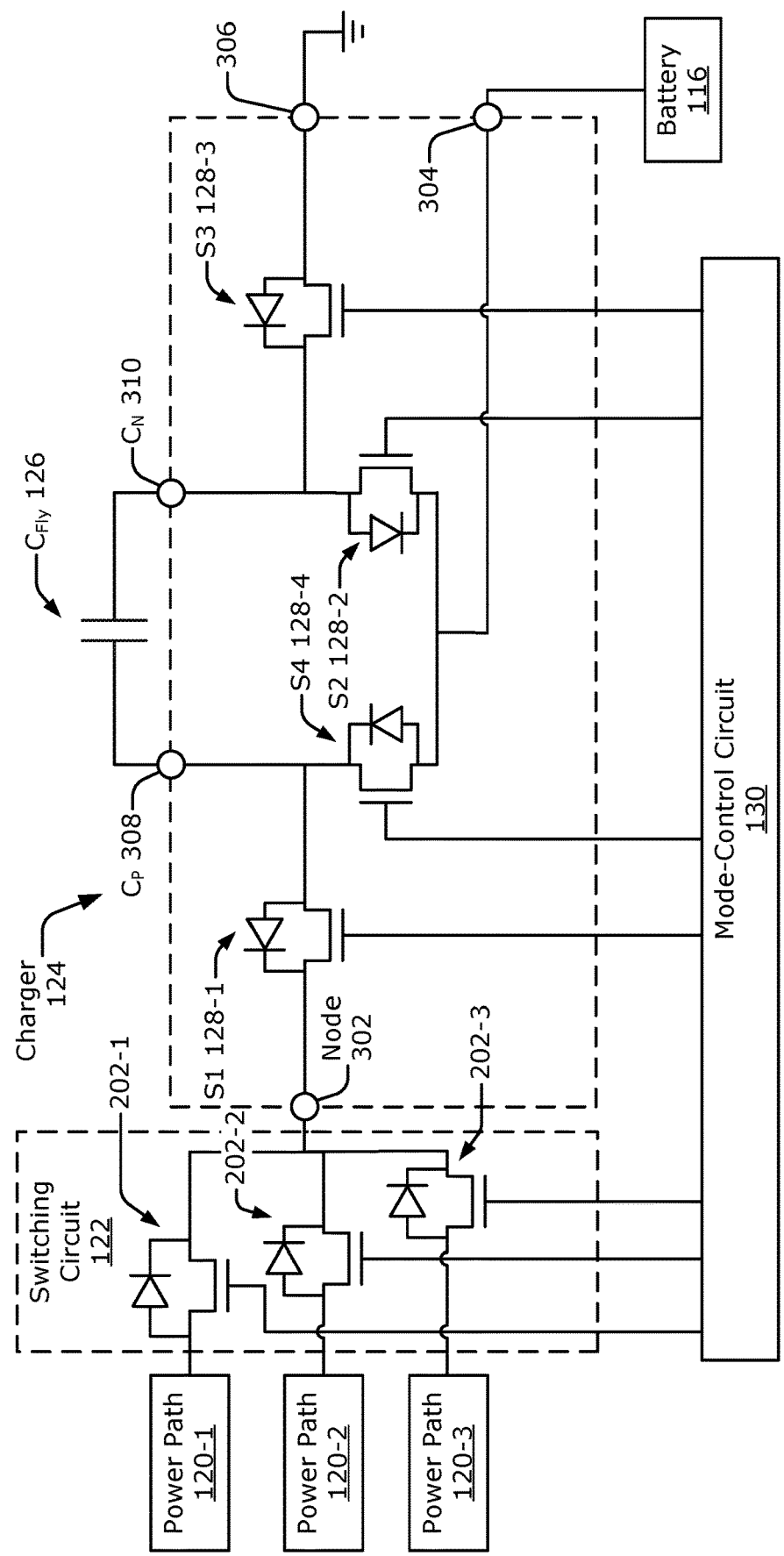
FIG. 5 illustrates example implementations of a switching circuit and a charger for adaptive multi-mode charging.

FIG. 5 illustrates example implementations of the switching circuit 122 and the charger 124 for adaptive multi-mode charging. In the depicted configuration, the switches 202-1 and 202-3 (of FIG. 2) and the switches 128-1 to 128-4 (of FIG. 3) are implemented using MOSFETs. The MOSFETs are in a common-gate configuration, which enables power to transfer in either direction across the other terminals (e.g., across the source terminal and the drain terminal). The switches 202-1 to 202-3 and 128-1 to 128-4 also include respective diodes coupled between the source and drain terminals. The mode-control circuit 130 is coupled to the gates of these MOSFETs and provides respective bias voltages to the gates. The bias voltages cause the switches 202-1 to 202-3 to respectively connect the power paths 120-1 to 120-3 to the charger 124. Other bias voltages cause the switches 128-1 to 128-4 to open or close according to one of the modes 400-1 to 400-4 described above.

Figure 6:
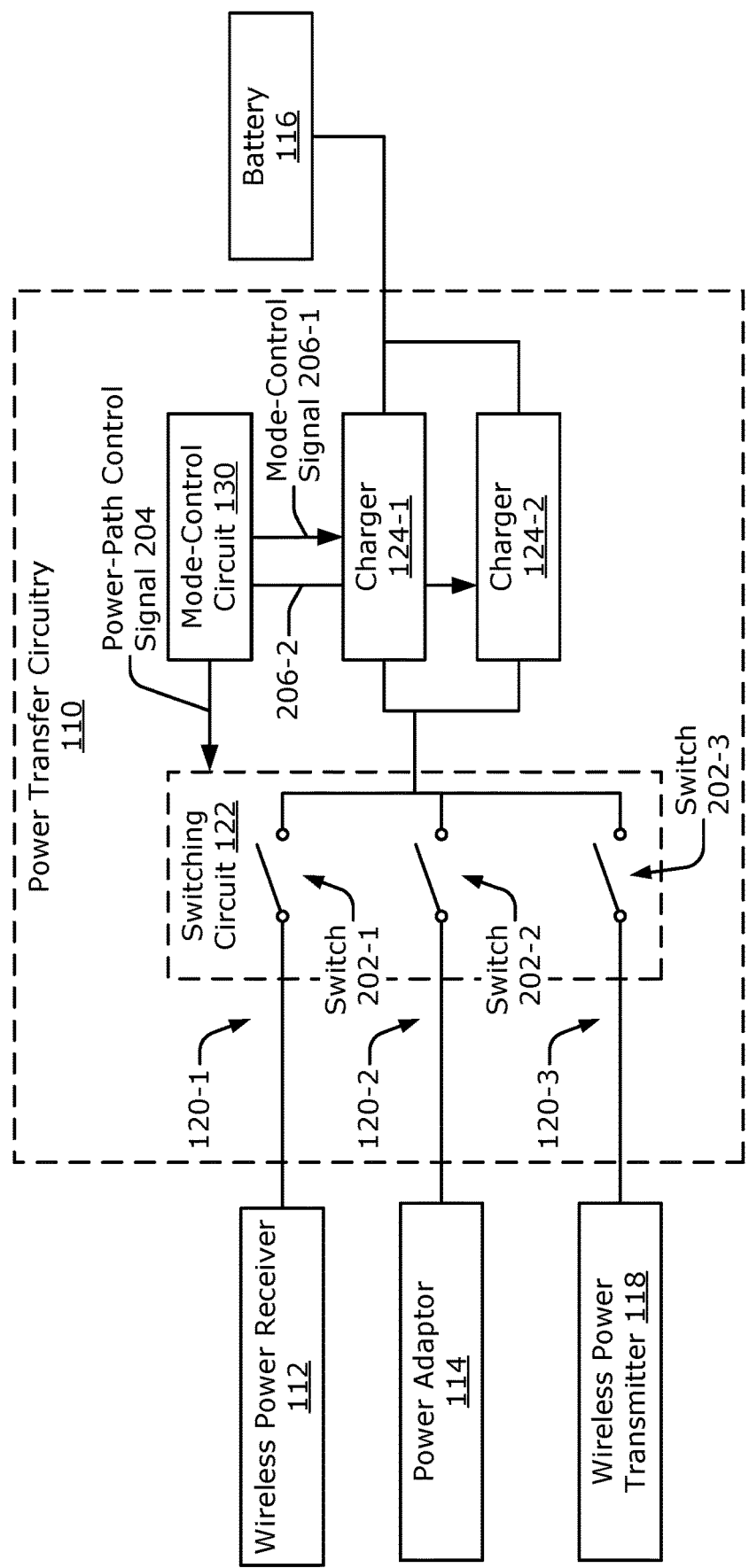
FIG. 6 illustrates example power transfer circuitry with multiple chargers coupled together in parallel for adaptive multi-mode charging.

FIG. 6 illustrates example power transfer circuitry 110 with multiple chargers 124-1 and 124-2 for adaptive multi-mode charging. In the depicted configuration, the chargers 124-1 and 124-2 are coupled together in parallel. The mode-control circuit 130 provides a first mode-control signal 206-1 to the charger 124-1 and a second mode-control signal 206-2 to the charger 124-2. The chargers 124-1 and 124-2 can operate in any of the modes 400-1 to 400-4 described above. In some cases, the chargers 124-1 and 124-2 operate with different phases, in order to provide dual-phase charging. Other implementations can include more than two chargers 124 to support multi-phase charging.

Figure 7:
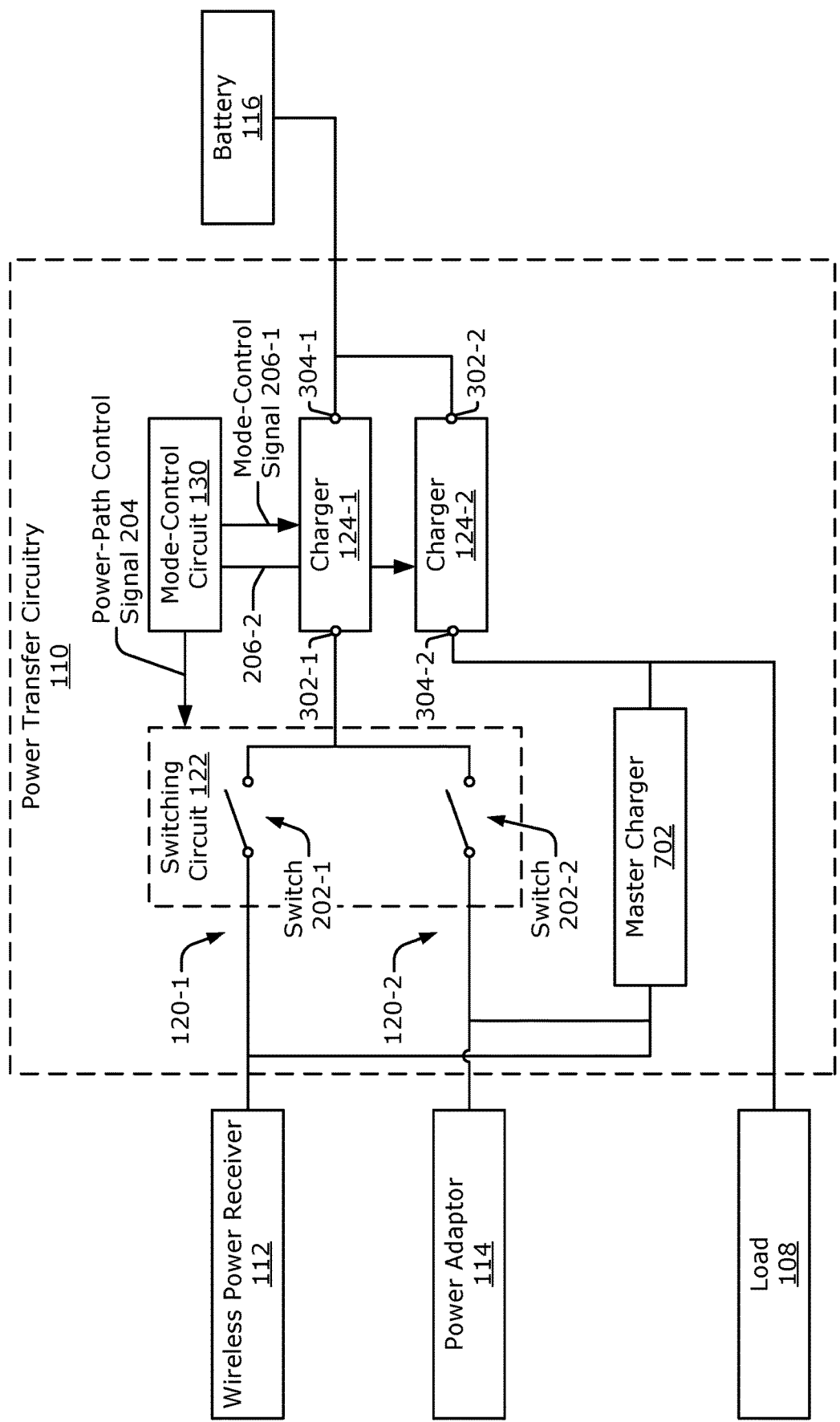
FIG. 7 illustrates example power transfer circuitry with multiple chargers to provide adaptive multi-mode charging for a multi-cell battery.

FIG. 7 illustrates example power transfer circuitry 110 with multiple chargers 124-1 to 124-2 to provide adaptive multi-mode charging for a multi-cell battery 116. In the depicted configuration, the power transfer circuitry 110 includes a mater charger 702, which can be coupled to the wireless power receiver 112 and/or the power adaptor 114.

In FIG. 7, the chargers 124-1 and 124-2 are implemented in different directions. For example, the node 302 of the charger 124-1 (shown as 302-1) is coupled to the switching circuit 122 and the node 304 of the charger 124-1 (shown as 304-1) is coupled to the battery 116. In contrast, the node 302 of the charger 124-2 (shown as 302-2) is coupled to the battery 116 and the node 304 of the charger 124-2 (shown as 304-2) is coupled to the master charger 702 and the load 108. By having opposite nodes 304-1 and 302-2 coupled to the battery 116, the charger 124-1 can operate as a voltage divider-type charge pump for forward charging 208 and the charger 124-2 can operate as a voltage divider-type charge pump for reverse charging 210. Additionally, the charger 124-1 can operates as a voltage-multiplier-type charge pump for reverse charging 210 and the charger 124-2 can operate as a voltage-multiplier-type charge pump for forward charging 208. The charger 124-2 can also operate in the direct forward-charging mode 400-3 or the direct reverse-charging mode 400-4 (of FIGS. 4-3 and 4-4).

In some implementations, the charger 124-1 implements a different type of charge pump than the charger 124-2. This enables the chargers 124-1 and 124-2 to provide different conversion ratios. Although not shown, the battery 116 can include two or more cells that are connected together in series.

During operation, power can be transferred between either one of the power paths 120-1 and 120-2 and the battery 116 using the charger 124-1 or the charger 124-2. The master charger 702 can provide another conversion ratio to enable the charger 124-2 to support different types of power adaptors 114 or different types of wireless power receivers 112. The charger 124-2 can also transfer power from the battery 116 to the load 108, which can include the wireless power transmitter 118.

Figure 8:
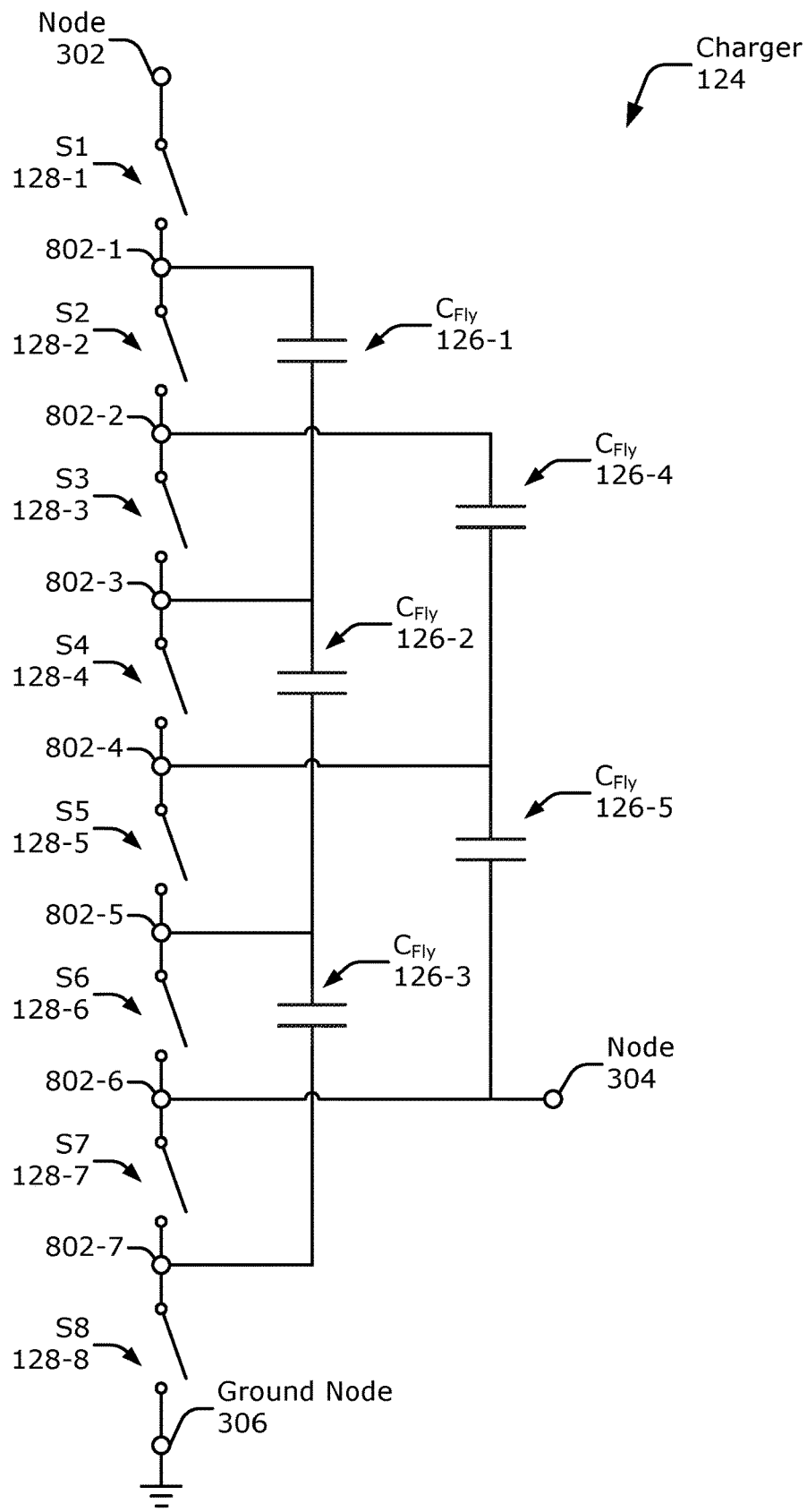
FIG. 8 illustrates another example charger for adaptive multi-mode charging.

FIG. 8 illustrates another example charger 124 for adaptive multi-mode charging. In the depicted configuration, the charger 124 can operate as a divide-by-four charge pump, a divide-by-two charge pump, a multiply-by-four charge pump, a multiply-by-two charge pump, or a direct charger to provide a conversion ratio of 4:1, 2:1 (or 4:2), 1:4, 1:2 (or 2:4), or 1:1, respectively.

The charger 124 includes the node 302, the node 304, and the ground node 306 (of FIG. 3). As described above, the node 302 operates as an input node and the node 304 operates as an output node for forward charging 208. Alternatively, for reverse charging 210, the node 304 operates as the input node and the node 302 operates as the output node.

The charger 124 includes multiple flying capacitors 126-1 to 126-5 ($C_{Fly}$, 126-1 to 126-5) and multiple switches 128-1 to 128-8. Nodes 802-1 to 802-7 exist between respective pairs of the switches 128-1 to 128-8. In particular, the node 802-1 is coupled between the first switch 128-1 (S1 128-1) and the second switch 128-2 (S2 128-2), the node 802-2 is coupled between the second switch 128-2 and the third switch 128-3 (S3 128-3), the node 802-3 is coupled between the third switch 128-3 and the fourth switch 128-4 (S4 128-4), the node 802-4 is coupled between the fourth switch 128-4 and the fifth switch 128-5 (S5 128-5), the node 802-5 is coupled between the fifth switch 128-5 and the sixth switch 128-6 (S6 128-6), the node 802-6 is coupled between the sixth switch 128-6 and the seventh switch 128-7 (S7 128-7), and the node 802-7 is coupled between the seventh switch 128-7 and the eight switch 128-8 (S8 128-8). The node 802-6 is the same as the node 304.

The flying capacitors 126-1 to 126-5 are coupled between different pairs of the nodes 802-1 to 802-7. In particular, the first flying capacitor 126-1 is coupled between the node 802-1 and the node 802-3. The flying capacitor 126-2 is coupled between the node 802-3 and the node 802-5. The flying capacitor 126-3 is coupled between the node 802-5 and the node 802-7. The flying capacitor 126-4 is coupled between the node 802-2 and the node 802-4. The flying capacitor 126-5 is coupled between the node 802-4 and the node 802-6.

The charger 124 of FIG. 8 can operate according to the voltage-divider forward-charging mode 400-1. To provide a 4:1 conversion ratio between the node 302 and the node 304 during the voltage-divider forward-charging mode 400-1, the switches 128-1 to 128-8 alternate between open and closed states. In this mode, the charger 124 can also provide a 2:1 conversion ratio between the node 302 and the node 802-4. In this case, the node 802-4 can be coupled to a load 108 within the computing device 102. Alternatively, the charger 124 can provide a 2:1 conversion ratio between the node 302 and the node 802-4 by operating the switches 128-3 and 128-4 in the closed state and having the switches 128-1, 128-2, 128-7, and 128-8 alternate between the open and closed states.

Additionally or alternatively, the charger 124 can operate according to the direct forward-charging mode 400-2 or the direct reverse-charging mode 400-3 to provide a 1:1 conversion ratio between the node 302 and the node 304. During either of these modes, the switches 128-1 to 128-6 are in the closed state and the switches 128-7 and 128-8 are in the open state.

Additionally or alternatively, the charger 124 can operate according to the voltage-multiplier reverse-charging mode 400-4 to provide a 1:4 conversion ratio between the node 304 and the node 302. During this mode, the switches 128-1 to 128-8 alternate between the open state and the closed state. In this mode, the charger 124 can also provide a 1:2 conversion ratio between the node 802-4 and the node 302. In this case, the node 802-4 can be coupled to a power supply circuit 106 within the computing device 102. Alternatively, the charger 124 can provide a 1:2 conversion ratio between the node 304 and the node 302 by operating the switches 128-3 and 128-4 in the closed state and having the switches 128-1, 128-2, 128-7, and 128-8 alternate between the open and closed states.

Figure 9:
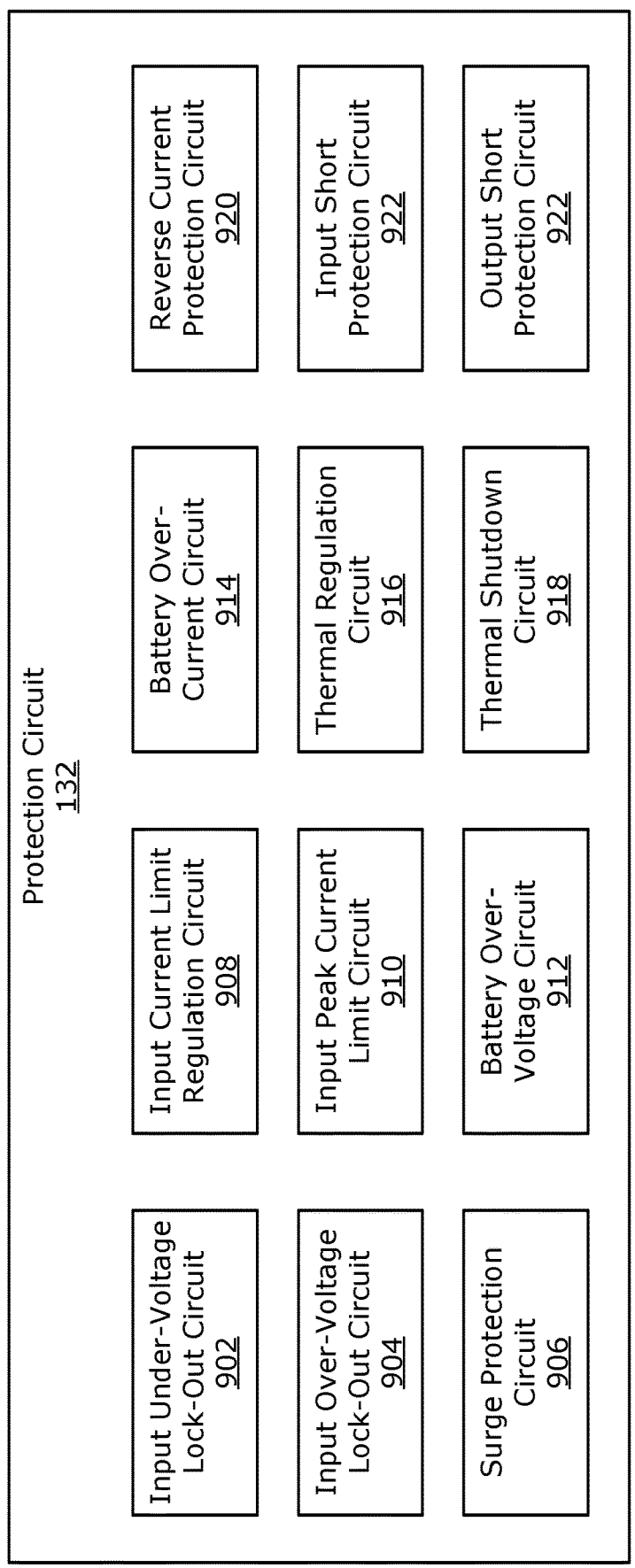
FIG. 9 illustrates an example protection circuit for adaptive multi-mode charging.

FIG. 9 illustrates an example protection circuit 132 for adaptive multi-mode charging. In the depicted configuration, the protection circuit 132 can include an input under-voltage lock-out circuit 902, an input over-voltage lock-out circuit 904, a surge protection circuit 906, an input current limit regulation circuit 908, an input peak current limit circuit 910, a batter over-voltage circuit 912, a battery over-current circuit 914, a thermal regulation circuit 916, a thermal shutdown circuit 918, a reverse current protection circuit 920, an input short protection circuit 922, an output short protection circuit 922, or some combination thereof.

The input under-voltage lock-out circuit 902 and the input over-voltage lock-out circuit 904 are coupled to the node 302 of the charger 124 and the mode-control circuit 130. Each of these circuits 902 and 904 can be implemented using a comparator (e.g., an operational amplifier). The input under-voltage lock-out circuit 902 and the input over-voltage lock-out circuit 904 jointly control operation of the mode-control circuit 130 based on an input voltage at the node 302. For example, the input under-voltage lock-out circuit 902 compares the input voltage at the node 302 to an under-voltage lock-out threshold, and the input over-voltage lock-out circuit 904 compares the input voltage to an over-voltage lock-out threshold. If the input voltage is between the under-voltage lock-out threshold and the over-voltage lock-out threshold, the input under-voltage lock-out circuit 902 and the input over-voltage lock-out circuit 904 allow the mode-control circuit 130 to operate the charger 124 (e.g., enable the charger 124 to charge and discharge the flying capacitor 126). Alternatively, if the input voltage is less than the under-voltage lock-out threshold or greater than the over-voltage lock-out threshold, the associated input under-voltage lock-out circuit 902 or the input over-voltage lock-out circuit 904 prevents the mode-control circuit 130 from enabling the charger 124 (e.g., prevents the mode-control circuit 130 from operating the switches 128-1 to 128-S of the charger 124).

The surge protection circuit 906 is coupled to one of the power paths 120-1 to 120-N. For example, the surge protection circuit 906 is coupled to the power path 120-2 of FIG. 2. The surge protection circuit 906 can include a diode, such as a transient-voltage-suppression (TVS) diode. Using the diode, the surge protection circuit 906 absorbs energy during a surge event. This provides additional time for the input over-voltage lock-out circuit 904 to detect an over-voltage event.

The input current limit regulation circuit 908 is coupled to the node 302 of the charger 124 and includes a current sensor and a comparator. Using the current sensor, the input current limit regulation circuit 908 monitors the input current and compares an average of the input current to an average current threshold. If the average of the input current is greater than or equal to the average current threshold, the input current limit regulation circuit 908 limits the input current to the charger 124 to protect the power adaptor 114.

The input peak current limit circuit 910 is coupled to the node 302 of the charger 124 and the mode-control circuit 130. In an example implementation, the input peak current limit circuit 910 includes a current sensor and a comparator. Using the current sensor, the input peak current limit circuit 910 monitors the input current and compares a peak of the input current to a peak current threshold. If the peak of the input current is greater than or equal to the peak current threshold, the input peak current limit circuit 910 directs the mode-control circuit 130 to power down the charger 124. In some cases, the input peak current limit circuit 910 can delay powering down the charger 124 until the peak current threshold has been exceeded a predetermined number of times.

The battery over-voltage circuit 912 and the battery over-current circuit 914 are each coupled to the battery 116 and the mode-control circuit 130. The battery over-voltage circuit 912 includes a voltage sensor and a comparator to monitor a voltage across the battery 116. During operation, the battery over-voltage circuit 912 can direct the mode-control circuit 130 to stop charging the flying capacitor 126 of the charger 124 if the voltage across the battery 116 is greater than or equal to an over-voltage threshold. By disabling the charging cycle, the battery over-voltage circuit 912 can prevent the battery 116 from being over charged.

The battery over-current circuit 914 includes a current sensor and a comparator to monitor an input current to the battery 116. The battery over-current circuit 914 directs the mode-control circuit 130 to limit the current provided to the battery 116 responsive to the current being greater than or equal to an over-current threshold. This ensures safe charging of the battery 116.

The thermal regulation circuit 916 is coupled to the power adaptor 114. During operation, the thermal regulation circuit 916 monitors a skin thermal of the power adaptor 114. If the skin thermal becomes greater than a thermal window, the thermal regulation circuit 916 directs the power adaptor 114 to reduce the current provided to the charger 124 to enable the temperature to decrease. Alternatively, if the skin thermal drops below the thermal window, the thermal regulation circuit 916 directs the power adaptor 114 to increase the current to increase charging efficiency.

The thermal shutdown circuit 918 is coupled to the charger 124 and the mode-control circuit 130. The thermal shutdown circuit 918 monitors a temperature of the die associated with the charger 124. If the die temperature becomes greater than or equal to a threshold, the thermal shutdown circuit 918 directs the mode-control circuit 130 to power down the charger 124 until the die temperature drops below a predetermined level.

The reverse current protection circuit 920 includes the switch 202-2 of the switching circuit 122, which is implemented between the power adaptor 114 and the charger 124. The reverse current protection circuit 920 detects when the power adaptor 114 is disconnected from the external power source 104 or the external load 105 and causes the switch 202-2 to be in the open state to disconnect the power adaptor 114 from the charger 124. In this way, the reverse current protection circuit 920 can prevent power from being transferred from the battery 116 to the power adaptor 114.

The input short protection circuit 922 can include the switch 202-2. During operation, the input short protection circuit 922 detects a short event in which the power adaptor 114 or the power path 120-2 is shorted to ground. In this situation, the input short protection circuit 922 causes the switch 202-2 to be in the open state to prevent the battery 116 from discharging.

The output short protection circuit 924 detects a short event in which the node 304 is shorted to ground. The output short protection circuit 924 includes a comparator to monitor the voltage at the node 304. If the voltage at the node 304 is less than a threshold, such as two volts, the output short protection circuit 924 directs the mode-control circuit 130 to power down the charger 124. This prevents the charger 124 from delivering a large current that can damage the battery 116.

Figure 10:
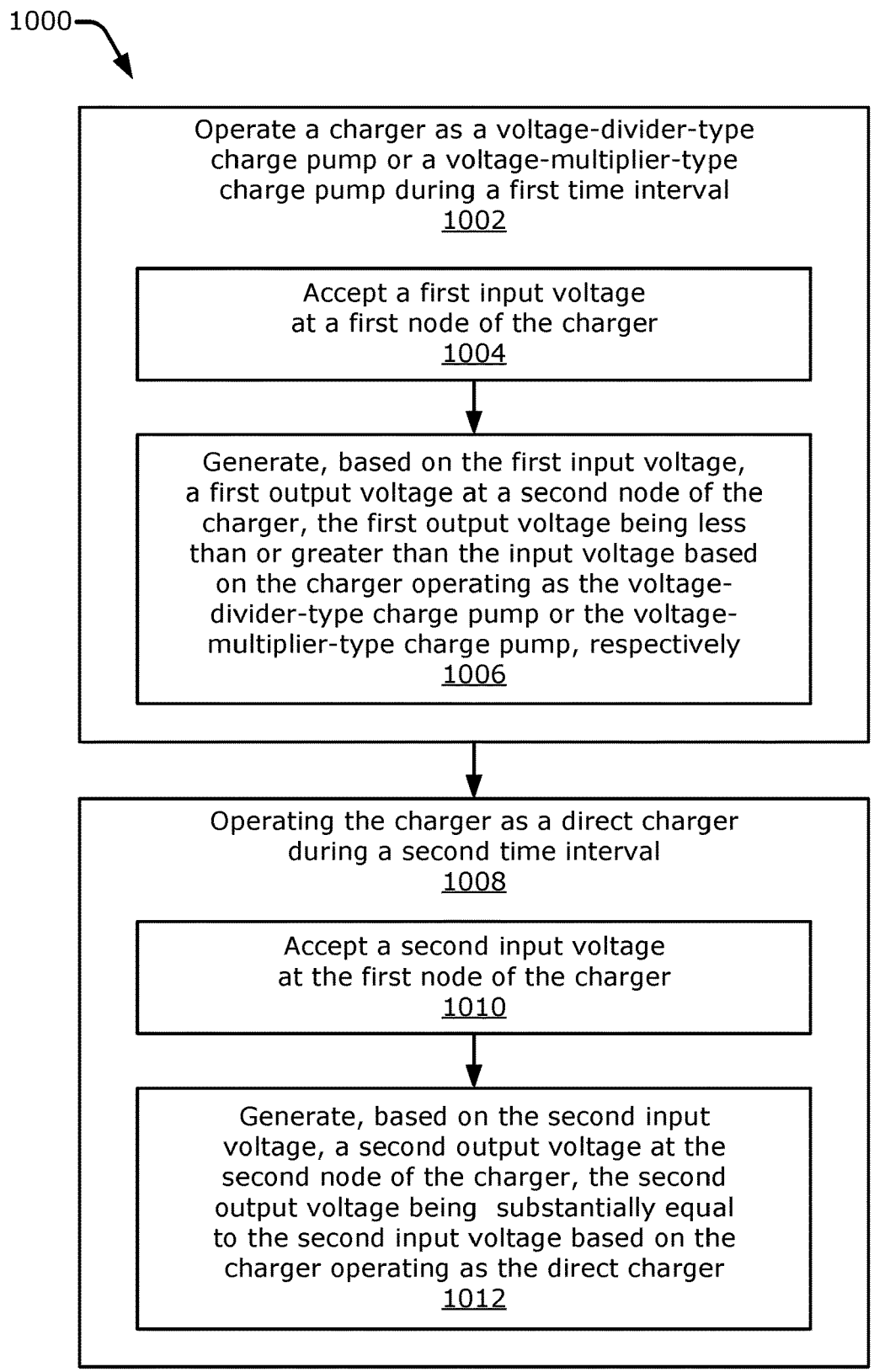
FIG. 10 is a flow diagram illustrating an example process for performing adaptive multi-mode charging.

FIG. 10 is a flow diagram illustrating an example process 1000 for adaptive multi-mode charging. The process 1000 is described in the form of a set of blocks 1002-1004 that specify operations that can be performed. However, operations are not necessarily limited to the order shown in FIG. 10 or described herein, for the operations may be implemented in alternative orders or in fully or partially overlapping manners. Operations represented by the illustrated blocks of the process 1000 may be performed by the power transfer circuitry 110 (e.g., of FIG. 1 or 2). More specifically, the operations of the process 1000 may be performed by the charger 124 as shown in FIG. 3, 5, or 8.

At block 1002, a charger operates as a voltage-divider-type charge pump or a voltage-multiplier-type charge pump during a first time interval. For example, the charger 124 operates as the voltage-divider-type charge pump or a voltage multiplier-type charge pump during a first time interval to support forward charging 208, as shown in FIG. 2.

At block 1004, a first input voltage is accepted at a first node of the charger. For example, the charger 124 accepts the input voltage 402 at the node 302, as shown in FIG. 4-1.

At block 1006, a first output voltage is generated at a second node of the charger. The first output voltage is based on the first input voltage. The first output voltage is less than or greater than the input voltage based on the charger operating as the voltage-divider-type charge pump or the voltage-multiplier-type charge pump, respectively. For example, the charger 124 generates an output voltage 404 at the node 304 that is less than or greater than the input voltage 402. As an example, the charger 124 can operate according to the voltage-divider forward-charging mode 400-1 of FIG. 4-1.

At block 1008, the charger operates as a direct charger during a second time interval. For example, the charger 124 operates as the direct charger during the second time interval to support forward charging 208, as shown in FIG. 2.

At block 1010, a second input voltage is accepted at the first node of the charger. For example, the charger 124 accepts the input voltage 402 at the node 302, as shown in FIG. 4-2.

At block 1012, a second output voltage is generated at the second node of the charger. The second output voltage is based on the second input voltage and is substantially equal to the second input voltage based on the charger operating as the direct charger. For example, the charger 124 generates the output voltage 404 at the node 304 that is substantially equal to (e.g., within 90% of) the input voltage 402 at the node 302. As an example, the charger 1002 can operate according to the direct forward-charging mode 400-2 of FIG. 4-2.

Additionally or alternatively, the charger can selectively operate as the voltage-divider-type charge pump, the voltage-multiplier-type charge pump, or the direct charger to support reverse charging 210, as shown in FIG. 2, 4-3, or 4-4. In this case, the charger 124 can generate an output voltage 404 at the node 302 that is less than, greater than, or substantially equal to an input voltage 402 at the node 304. As an example, the charger 124 can operate according to the voltage-multiplier reverse-charging mode 400-3 or the direct reverse-charging mode 400-4 of FIGS. 4-3 and 4-4, respectively.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus comprising:
   power transfer circuitry comprising:
      a first power path configured to be coupled to a first power circuit, wherein the first power circuit comprises a wireless power receiver or a wireless power transmitter;
      a second power path configured to be coupled to a second power circuit, wherein the second power circuit comprises a power adapter;
   a first node;
   a second node;
   a switching circuit coupled between the first and second power paths and the first node;
      a first charger comprising a charge pump and coupled between the first node and the second node; and
   a second charger coupled between the first node and the second node;
      wherein the switching circuit is configured to connect the first and second power paths to the first and second chargers, wherein the first and second chargers operate with different phases and provide multi-phase charging.

2. The apparatus of claim 1, wherein the second node is configured to be coupled to a battery.

3. The apparatus of claim 2, further comprising:
   the battery coupled to the second node of the power transfer circuitry.

4. The apparatus of claim 1, wherein:
   the power transfer circuitry comprises a third power path configured to be coupled to a third power circuit;
   the first power circuit comprises the wireless power receiver; and
   the third power circuit comprises the wireless power transmitter.

5. The apparatus of claim 1, wherein the switching circuit comprises:
   a first switch coupled between the first power path and the first node; and
   a second switch coupled between the second power path and the first node.

6. The apparatus of claim 5, wherein the first switch comprises:
   a transistor coupled between the first power path and the first node; and
   a diode coupled between the first power path and the first node and in parallel with the transistor.

7. The apparatus of claim 1, wherein the first charger comprising the charge pump is coupled in parallel with the second charger between the first node and the second node.

8. The apparatus of claim 1, wherein the first charger comprising the charge pump comprises a first charge pump.

9. The apparatus of claim 8, wherein the first charge pump comprises:
   a flying capacitor; and
   four switches coupled to the flying capacitor.

10. The apparatus of claim 9, wherein:
    the four switches comprise a first switch, a second switch, a third switch, and a fourth switch;
    the flying capacitor is coupled between a first capacitor node and a second capacitor node;
    the first switch is coupled between the first node and the first capacitor node;
    the second switch is coupled between the second capacitor node and the second node;
    the third switch is coupled between the second capacitor node and a ground node; and
    the fourth switch is coupled between the first capacitor node and the second node.

11. The apparatus of claim 8, wherein the first charge pump is configured to operate in a multiply-by-N mode, where N is a positive integer greater than one.

12. The apparatus of claim 8, wherein the first charge pump is configured to operate in a direct charging mode using at least one switch of the first charge pump.

13. The apparatus of claim 8, wherein:
    the first charge pump is configured to operate in a forward-charging mode in which power is transferred from at least one of the first power path or the second power path to the second node; and
    the second charger comprises a second charge pump configured to operate in a reverse-charging mode in which power is transferred from the second node to at least one of the first power path or the second power path.

14. The apparatus of claim 1, wherein:
    the first charger is configured to operate in accordance with a first phase responsive to a first control signal; and
    the second charger is configured to operate in accordance with a second phase responsive to a second control signal, the second phase different from the first phase.

15. A method comprising:
    connecting a first power path to a first charger comprising a charge pump and a second charger using a switching circuit;
    transferring, by the first charger, power between a first power circuit and a battery using the first power path and the switching circuit, wherein the first power circuit comprises a wireless power receiver or a wireless power transmitter;
    transferring, by the second charger, power between the first power circuit and the battery using the first power path and the switching circuit;
    connecting a second power path to the first charger and the second charger using the switching circuit;
    transferring, by the first charger, power between a second power circuit and the battery using the second power path and the switching circuit, wherein the second power circuit comprises a power adapter; and
    transferring, by the second charger, power between the second power circuit and the battery using the second power path and the switching circuit, wherein the first and second chargers operate with different phases and provide multi-phase charging.

16. The method of claim 15, wherein:

the transferring, by the first charger, power between the first power circuit and the battery comprises transferring, by the first charger, power from the battery to the wireless power transmitter using the first power path and the switching circuit; and the transferring, by the second charger, power between the first power circuit and the battery comprises transferring, by the second charger, power from the battery to the wireless power transmitter using the first power path and the switching circuit.

17. An apparatus comprising:

power transfer circuitry comprising:
- a first power path configured to be coupled to a first power circuit, wherein the first power circuit comprises a wireless power receiver or a wireless power transmitter;
- a second power path configured to be coupled to a second power circuit, wherein the second power circuit comprises a power adapter;
- a first charger comprising a charge pump and coupled to a battery node;
- a switching circuit coupled between the first and second power paths and the first charger;
- a second charger coupled the battery node; and
- a master charger coupled between the first and second power paths and the second charger;

wherein the switching circuit is configured to connect the first and second power paths to the first and second chargers, wherein the first and second chargers operate with different phases and provide multi-phase charging.

18. The apparatus of claim 17, wherein:

the battery node is coupled to the first charger via a node that is coupled between two switches of the first charger; and the battery node is coupled to the second charger via another node that is not coupled between two switches of the second charger.

\* \* \* \* \*